(12) United States Patent
Ito

(10) Patent No.: US 8,488,149 B2
(45) Date of Patent: Jul. 16, 2013

(54) ELIMINATING TRANSMISSION ERROR AT THE TIME OF TRANSMISSION OF THE IMAGE DATA

(75) Inventor: Tomohiro Ito, Mizuho (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1114 days.

(21) Appl. No.: 12/198,094

(22) Filed: Aug. 25, 2008

(65) Prior Publication Data
US 2009/0051964 A1    Feb. 26, 2009

(30) Foreign Application Priority Data
Aug. 23, 2007    (JP) .................................. 2007-217167

(51) Int. Cl.
*G06F 3/12*    (2006.01)

(52) U.S. Cl.
USPC ........................................ 358/1.15; 358/1.16

(58) Field of Classification Search
USPC .............................................. 358/1.15, 1.16
See application file for complete search history.

(56) References Cited

U.S. PATENT DOCUMENTS

| | | | |
|---|---|---|---|
| 6,424,429 B1 | 7/2002 | Takahashi et al. | |
| 6,469,797 B2 | 10/2002 | Sakai | |
| 2004/0156487 A1* | 8/2004 | Ushiki et al. | 379/88.22 |
| 2004/0233471 A1* | 11/2004 | Inoue et al. | 358/1.14 |
| 2004/0252338 A1* | 12/2004 | Oomori | 358/1.15 |
| 2005/0264846 A1 | 12/2005 | Tsuzuki | |
| 2006/0075362 A1* | 4/2006 | Moteki et al. | 715/838 |
| 2007/0035762 A1* | 2/2007 | Wilsher et al. | 358/1.14 |
| 2007/0219795 A1* | 9/2007 | Park et al. | 704/246 |
| 2007/0223051 A1* | 9/2007 | Henry et al. | 358/407 |
| 2008/0007789 A1* | 1/2008 | La | 358/400 |
| 2008/0104408 A1* | 5/2008 | Mayer | 713/178 |

FOREIGN PATENT DOCUMENTS

| | | |
|---|---|---|
| EP | 1 727 037 A2 * | 4/2006 |
| JP | H11-143908 A | 5/1999 |
| JP | H11-144047 A | 5/1999 |
| JP | 2000059553 A | 2/2000 |
| JP | 2002-032205 A | 1/2002 |
| JP | 2005335282 A | 12/2005 |
| JP | 2006031485 A | 2/2006 |
| JP | 2006-253959 A | 9/2006 |
| JP | 2006246284 A | 9/2006 |
| JP | 2007-060425 A | 3/2007 |

OTHER PUBLICATIONS

Japan Patent Office, Office Action for Japanese Patent Application No. 2007-217167 (counterpart to above-captioned patent application), mailed Sep. 27, 2011.

* cited by examiner

*Primary Examiner* — Benny Tieu
*Assistant Examiner* — Eric A Rust
(74) *Attorney, Agent, or Firm* — Baker Botts L.L.P.

(57) ABSTRACT

A communication device includes a first tag data reading unit, a storing unit, an extracting unit, a display unit, and a transmitting unit. The first tag data reading unit is configured to read tag data from a wireless tag. The tag data is written in the wireless tag. The storing unit is configured to store transmit data and identification data in association with each other from the storing unit. The extracting unit is configured to extract, if the tag data corresponds to the identification data, the transmit data in association with the identification data. The display unit is configured to display contents of the transmit data that is extracted by the extracting unit. The transmitting unit is configured to transmit the transmit data displayed on the display unit to a destination device.

15 Claims, 10 Drawing Sheets

FIG.5

| NO. | REGISTRATION TIME | ID INFORMATION | FIRST DESTINATION INFORMATION | TRANSMITTED IMAGE DATA | SECOND DESTINATION INFORMATION | EDITING INFORMATION |
|---|---|---|---|---|---|---|
| 1 | 2007/7/10 10:30 | A001 | ○○ CO. LTD. | 001 | AAA@xxx.co.jp | NOT EDITED |
| 2 | 2007/7/10 10:45 | B007 | ×× TRADING CO. | 002 | BBB@xxx.co.jp | NOT EDITED |
| 3 | 2007/7/10 11:10 | C002 | △△ (CO. LTD.) | 003 | CCC@xxx.co.jp | NOT EDITED |
| 4 | 2007/7/10 11:35 | A001 | □□ BANK | 004 | AAA@xxx.co.jp | NOT EDITED |
| 5 | 2007/7/10 10:45 | C002 | ＊＊ OFFICE | 005 | CCC@xxx.co.jp | NOT EDITED |
| 6 | 2007/7/10 11:56 | A001 | ＋＋ CO. LTD. | 006 | AAA@xxx.co.jp | EDITED |
| 7 | 2007/7/10 13:00 | D005 | ●● CO. LTD. | 007 | DDD@xxx.co.jp | NOT EDITED |
| ... | ... | ... | ... | ... | ... | ... |

| REGISTRATION TIME | ID INFORMATION | FIRST DESTINATION INFORMATION | SECOND DESTINATION INFORMATION |
|---|---|---|---|
| 10:30 | A001 | ○○ CO. LTD. | AAA@XXX.co.jp |
| 11:35 | A001 | □□ BANK | AAA@XXX.co.jp |
| 11:56 | A001 | ++ CO. LTD. | AAA@XXX.co.jp |

OK

CANCEL

ELIMINATING TRANSMISSION ERROR AT THE TIME OF TRANSMISSION OF THE IMAGE DATA

CROSS REFERENCE TO RELATED APPLICATION

The present application claims priority from Japanese patent application No. 2007-217167 filed Aug. 23, 2007. The entire content of the priority application is incorporated herein by reference.

TECHNICAL FIELD

The present invention relates to a communication device and a communication system that are capable of transmitting image data. More particularly, the present invention relates to a communication device and a communication system that are capable of eliminating any transmission error at the time of transmission of the image data.

BACKGROUND

In facsimile devices, various inventions for preventing human errors in facsimile transmission for a document have been made. Such inventions include an invention relating to a copy/facsimile composite machine as described in Japanese Patent Application Publication No. 2006-246284.

The copy/facsimile composite machine as described in Japanese Patent Application Publication No. 2006-246284 first discloses that an image based on image data of a document is displayed on a display screen of a personal computer externally connected to the copy/facsimile composite machine when transmitting the image data of the document. With this arrangement, an operator of the copy/facsimile composite machine can check contents of the image data of the document and quality of the image of the document before transmitting the image data of the document.

SUMMARY

However, while the operator of the copy/facsimile composite machine described in Japanese Patent Application Publication No. 2006-246284 can check the contents of the image data of the document and defined parameters, the checking operation is obviously conducted solely by the operator according to the description of Japanese Patent Application Publication No. 2006-246284. Then, the correctness of the facsimile transmission relies on the sole operator and hence, if there is any transmission error such as an error in a specified destination of the facsimile transmission, the transmission error cannot be reliably prevented.

Additionally, the copy/facsimile composite machine described in Japanese Patent Application Publication No. 2006-246284 reads the image data of the document, the copy/facsimile composite machine immediately displays only the read image data on the display screen. After displaying the image data, transmit data is actually transmitted to the destination specified by way of an operation performed by the operator. Thus, according to the invention of Japanese Patent Application Publication No. 2006-246284, the operator can check the contents of the image data of the document but cannot check the specified destination of transmission. Thus, the invention of Japanese Patent Application Publication No. 2006-246284 has a difficulty of preventing a transmission error that arises due to an error in specifying the destination of transmission.

Besides, transmitting information by facsimile transmission may include confidential information that gives rise to a serious problem when the information is leaked to the outside. Any transmission error due to an error in specifying the destination needs to be rigorously eliminated particularly when transmitting the confidential information. Therefore, after being checked the transmit data by a plurality of operators, the transmit data is transmitted to the intended destination by facsimile transmission certainly.

However, in the copy/facsimile composite machine described in Japanese Patent Application Publication No. 2006-246284, the image data of the document is displayed on the display screen only immediately after the machine reads the image data from the document. Therefore, when the plurality of operators checks the transmit data based on content of the image data displayed on the display screen, the plurality of operators needs to watch the same display screen. Then, excessive time requirements are imposed on the plurality of operators, thereby reducing the operating efficiency of the operators In view of the foregoing, the present invention has been made in order to solve the problems with the conventional technique. It is an object of the present invention to provide a communication device and a communication system that are capable of avoiding any transmission error in transmission of the image data, thereby improving the operating efficiency of the operator.

To achieve the above and other objects, one aspect of the invention provides a communication device including a first tag data reading unit, a storing unit, an extracting unit, a display unit, and a transmitting unit. The first tag data reading unit is configured to read tag data from a wireless tag. The tag data is written in the wireless tag. The storing unit is configured to store transmit data and identification data in association with each other from the storing unit. The extracting unit is configured to extract, if the tag data corresponds to the identification data, the transmit data in association with the identification data. The display unit is configured to display contents of the transmit data that is extracted by the extracting unit. The transmitting unit is configured to transmit the transmit data displayed on the display unit to a destination device.

In another aspect of the present invention, there is provided a communication system including an information terminal and a communication device that is configured to be capable of communicating with the information terminal through a communication network. The information terminal includes a designation unit and a first transmitting unit. The designation unit is configured to designate document data. The first transmitting unit is configured to transmit identification data and transmit data including the document data and destination specifying data specifying a destination device, to the communication device. The identification data being in association with the transmit data. The communication device includes, a first tag data reading unit, a storing unit, an extracting unit, a display unit, and a second transmitting unit. The first tag data reading unit is configured to read tag data from a wireless tag. The tag data is written in the wireless tag. The storing unit is configured to store the transmit data and identification data in association with each other. The extracting unit is configured to extract the transmit data in association with the identification data, if the tag data read by the first tag data reading unit corresponds to the identification data. The display unit is configured to display contents of the transmit data that is extracted by the extracting unit. The second transmitting unit is configured to transmit the transmit data displayed on the display unit to the destination device.

BRIEF DESCRIPTION OF THE DRAWINGS

In the drawings:

FIG. 5 is an explanatory diagram showing an example of a storing content in the transmission history memory area of the facsimile device according to the embodiment;

FIG. 10 shows an example of corresponding data list screen according to the embodiment;

DETAILED DESCRIPTION

Figure 1:
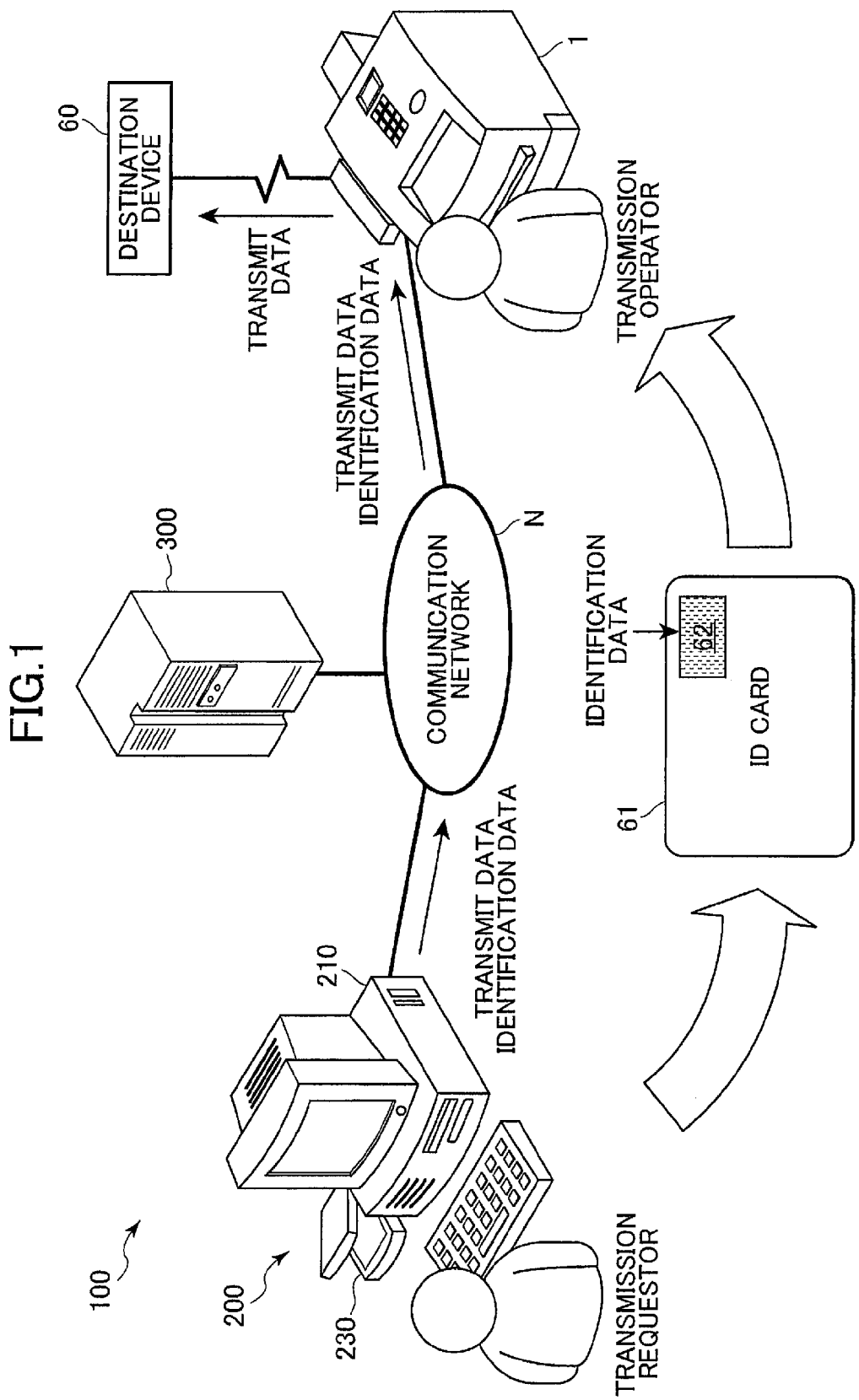
FIG. 1 is an explanatory diagram showing a facsimile transmission according to an embodiment of the present invention.

Next, a communication device and a communication system according to an embodiment of the present invention will be described with reference to the accompanying drawings. The communication device according to the embodiment is applied to a facsimile device and the communication system uses the facsimile device. FIG. 1 schematically illustrates the communication system according to the embodiment of the present invention and also the facsimile device 1 according to the present invention and summarily shows how the facsimile device 1 operates.

As shown in FIG. 1, the facsimile device 1 of this embodiment is connected to an information terminal 200 and a mail server 300 by way of a communication network N to establish a communication system 100. The facsimile device 1 is used not only for transmitting image data which is read by the facsimile device 1 for facsimile transmission but also for transmit data transmitted from the information terminal 200 to another device.

Since the mail server 300 is a well known mail server device, the mail server 300 will not be described here in greater detail.

Next, the operation for executing facsimile transmission based on transmit data in the communication system 100 of this embodiment will be described with reference to FIG. 1.

Firstly, a transmission requester transmits, as transmit data, document data and first destination specifying data to the facsimile device 1. The document data is created on the information terminal 200 or another terminal. The first destination specifying data indicates a destination (e.g., the facsimile number data). Then, the transmit data that is transmitted to the facsimile device 1 is further transmitted to the destination device 60 from the facsimile device 1 without any additional processing.

Hereinafter, this transmission mode will be referred to as "ordinary transmission". Since such the "ordinary transmission" is well known, the detailed description of the ordinary transmission will be omitted.

Depending on contents of the transmit data, any transmission error has to be rigorously eliminated when the transmit data is actually transmitted. For this purpose, the facsimile device 1 and the communication system 100 can be operated in a transmission mode where the transmission operator checks the contents of the transmit data and the first destination specifying data, and the transmit data is actually transmitted to the destination by facsimile transmission only when the transmission operator authorizes that the transmit data can be transmitted. Since not only the transmission requestor but also the transmission operator can check the contents of the transmit data (including the contents of the image data and the first destination specifying data), any transmission error of the facsimile transmission for the transmit data can be eliminated.

This transmission mode will be referred to as "accumulated transmission" hereinafter because the transmit data are stored once in an accumulated transmit data memory area 141 (see FIG. 4) of the facsimile device 1.

The transmission requester also transmits identification data that indicates the transmission requester, to the facsimile device 1 together with the transmit data (the image data of the document and the first destination specifying data) when the transmission requester executes the "accumulated transmission". More specifically, the transmission requester inputs the identification data to the information terminal 200 by means of a transmission requestor's ID card 61 and transmits the identification data to the facsimile device 1 together with the transmit data.

The ID card 61 is provided with a wireless tag 62 that stores wireless tag data including the identification data indicating the transmission requester. Thus, the transmission requester can input identification data of the transmission requester by reading the wireless tag 62 of the ID card 61 by a wireless tag reader/writer 230 of the information terminal 200. The wireless tag 62 is an IC tag or a RAFID (Radio Frequency Identification) tag that is capable of reading and writing data in a contactless state. Then, the transmit data that is actually transmitted with the identification data is associated with the identification data and stored in the accumulated transmit data memory area 141 of the facsimile device 1.

After transmitting the identification data and the transmit data to the facsimile device 1, the transmission requester hands over the ID card 61 to the transmission operator and requests transmission of the transmit data by facsimile transmission.

As the transmission operator receives the request for facsimile transmission, the transmission operator inputs the identification data of the transmission requester to the facsimile device 1 based on the ID card 61 received from the transmission requester. More specifically, the transmission operator reads the wireless tag 62 of the ID card 61 by a wireless tag reader 15 (see FIG. 4) of the facsimile device 1. As a result, the facsimile device 1 can acquire the identification data of the transmission requester written on the wireless tag 62 of the ID card 61.

Then, the facsimile device 1 identifies one transmit data that is associated with the acquired identification data, from the transmit data stored in the accumulated transmit data memory area 141 based on the acquired identification data. Then, the LCD 18 of the facsimile device 1 displays the contents of the identified transmit data (the contents of image based on the image data of the document and of specified destination based on the first destination specifying data).

The transmission operator can check and see the contents of the image data of the document and the specified destination of the facsimile transmission by seeing a display on the LCD 18. If there is not any error in the contents of the transmit data as a result of the check, the transmission operator transmits the transmit data to the destination device 60 of the specified destination by facsimile transmission.

Thus, with the "accumulated transmission" of this embodiment, the transmit data is checked by the transmission operator in addition to the check on the transmit data by the transmission requester at the time when the transmit data is transmitted to the facsimile device 1 so that any transmission error in the transmit data can be rigorously prevented. The process that is executed when there is an error in the contents of the transmit data will be described later.

Figure 2:
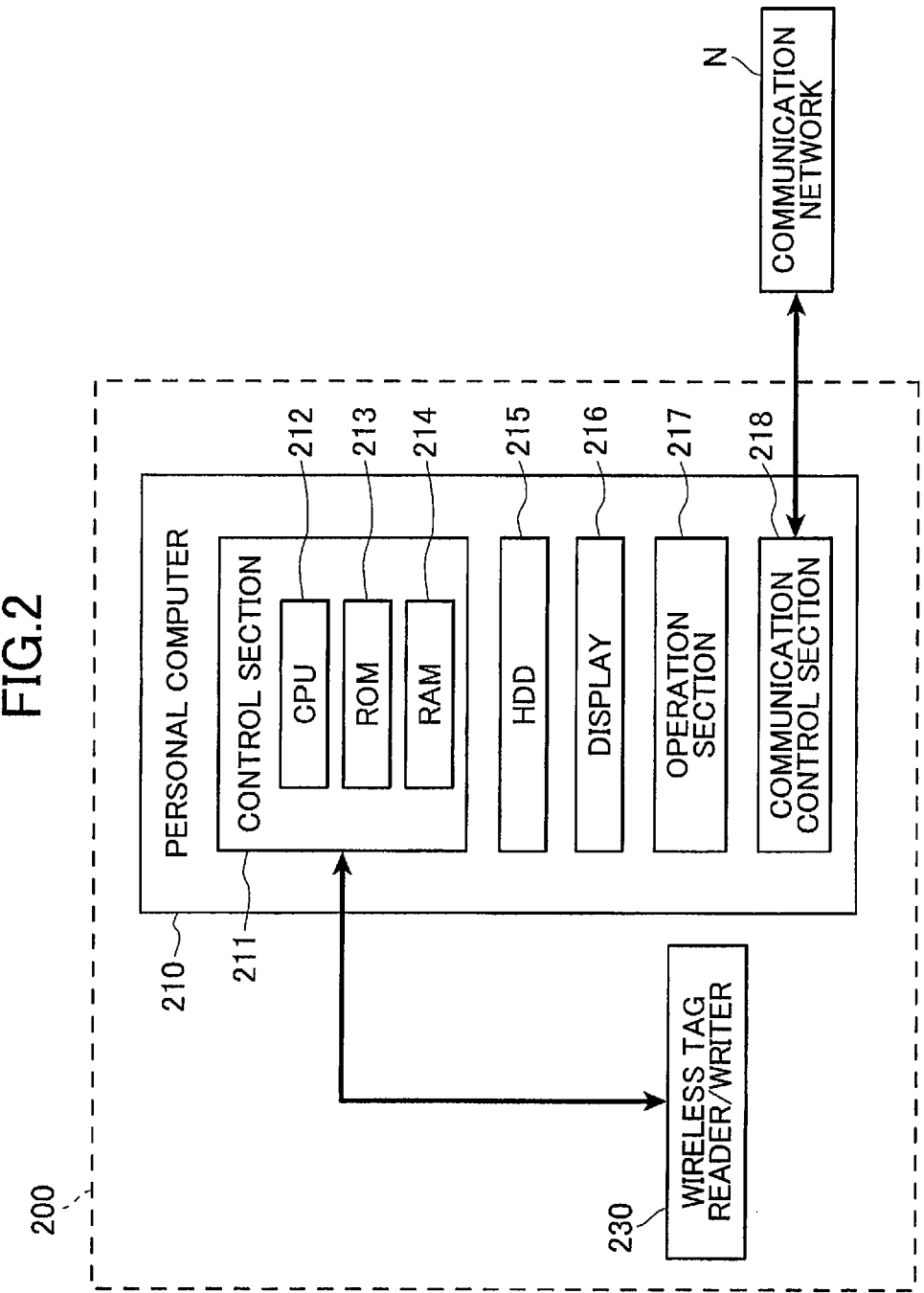
FIG. 2 is a block diagram showing a configuration of an information terminal of the communication system according to the embodiment.

Next, the information terminal 200 of this embodiment will be described in greater detail below with reference to FIGS. 1 and 2. The information terminal 200 includes the personal computer 210 and the wireless tag reader/writer 230 (see FIGS. 1 and 2). As described above, the information terminal 200 is employed for creating transmit data and transmitting the transmit data to the facsimile device 1.

The personal computer 210 comprehensively controls the information terminal 200. As shown in FIG. 2, the personal computer 210 has a control section 211, an HDD 215, a display 216, an operation section 217 and a communication control section 218.

The control section 211 takes a pivotal role of controlling the information terminal 200 and includes a CPU 212, a ROM 213 and a RAM 214. The CPU 212 takes a pivotal role of controlling the personal computer 210 and executes various control programs. The ROM 213 is a memory storing a document creating process program that is necessary for controlling the information terminal 200, a data transmission processing program (see FIG. 7) which will be described later and a transmit data modifying program (see FIG. 12). The RAM 214 is a memory unit that temporarily stores the arithmetic results of the control program obtained as a result of execution of the control program.

The HDD 215 is a rewritable memory connected to the control section 211. The HDD 215 stores various data generated as a result of execution of the control program by the control section 211. For example, as the document creating process program is executed, created document data is stored in the HDD 215.

As the document data stored in the HDD 215 are selected as object of facsimile transmission in the document data selecting process (S101), which will be described later, the selected document data constitutes a part of the transmit data.

The display 216 is a so-called liquid crystal display and displays the document in process of creation, contents of data written on the wireless tag 62, or contents of data stored on the wireless tag 62. Additionally, with this embodiment, the text of "transmission result notification" or "reconfirmation request notification", which will be described later, is also displayed. When the transmit data is transmitted back (returned) from the facsimile device 1, the transmit data (returned data) that is transmitted back (returned), is also displayed on the display 216.

The operation section 217 is an operation unit that operations are conducted for the information terminal 200. The operation section 217 includes a keyboard and a mouse to be used when creating data of the document. The operation section 217 also function as a selecting unit for selecting the document data to be transmitted to the facsimile device 1 and the mode of facsimile transmission (namely, "ordinary transmission" or "accumulated transmission").

The communication control section 218 operates to connect the information terminal 200 to the communication network N and communicate with the facsimile device 1 and the mail server 300. In other words, the communication control section 218 operates when the transmit data and the identification data from the information terminal 200 to the facsimile device 1 and when receiving the "transmission result notification", the "reconfirmation request notification" or the "returned data" transmitted from the facsimile device 1 by way of the mail server 300.

The wireless tag reader/writer 230 is a device for writing data in and reading data from the wireless tag 62. In other words, the wireless tag reader/writer 230 is employed when executing the "accumulated transmission" in the facsimile transmission. That is, the wireless tag reader/writer 230 is used when reading the identification data of the transmission requester from the wireless tag 62 of the ID card 61 of the transmission requester.

Additionally, the wireless tag reader/writer 230 is connected to the control section 211 of the personal computer 210. Therefore, the identification data read from the wireless tag 62 is transmitted to the control section 211. As a result, the identification data read by the wireless tag reader/writer 230 is transmitted to the facsimile device 1 together with the transmit data in the "accumulated transmission".

Figure 3:
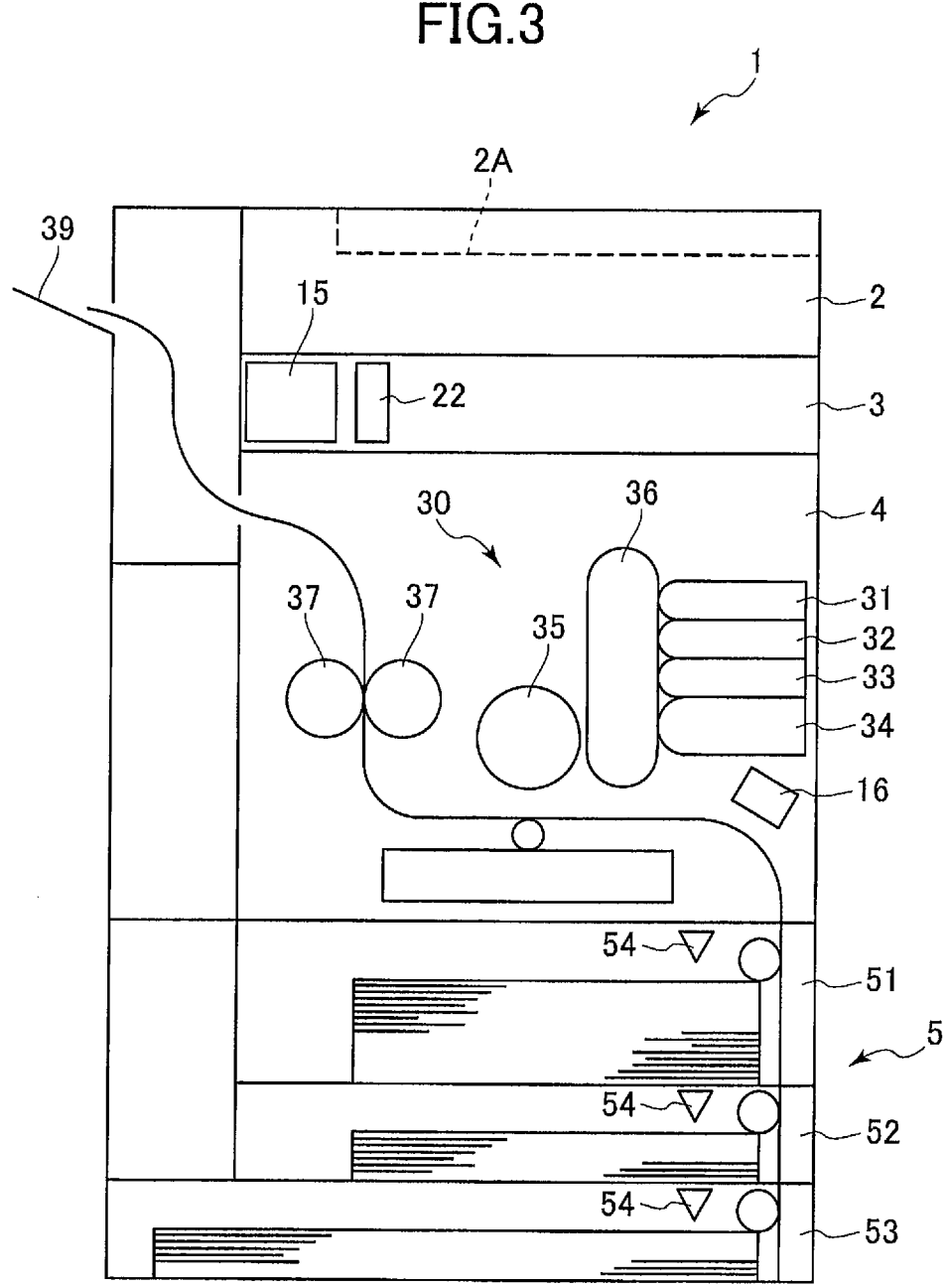
FIG. 3 is a schematic cross-sectional view showing a configuration of a facsimile device according to the embodiment.

Next, the configuration of the facsimile device 1 of this embodiment will be described below in greater detail with reference to FIG. 3. FIG. 3 is a schematic cross-sectional view showing the configuration of the facsimile device 1 of this embodiment. As shown in FIG. 3, the facsimile device 1 that the transmission operator operates includes an automatic document feeder 2, a scanner section 3, a printer section 4 and a paper feed tray section 5.

The automatic document feeder 2 has a document mount unit 2A. When executing the facsimile transmission, documents to be sent by facsimile are placed on the document mount unit 2A. Then, as the user depresses a start key (not shown), the documents are transported one by one, to the scanner section 3. The scanner unit 3 reads image data printed on each document. When the scanner section 3 finishes reading the image data, each of the documents is ejected from facsimile device 1 through a document-ejecting port (not shown).

The scanner section 3 has a scanner 22. The scanner 22 reads the image data of the document fed in by the automatic document feeder 2.

The printer section 4 has a laser printer 30. The laser printer 30 includes a Y-station 31, an M-station 32, a C-station 33 and a K-station 34. The Y-station 31 accommodates a yellow toner. Similarly, the M-station 32 accommodates a magenta toner and the C-station 33 accommodates a cyan toner, while the K-station 34 accommodates a black toner. The laser printer 30 also includes a transfer drum 35, an intermediate transfer belt 36 and image-fixing rollers 37. The intermediate transfer belt 36 transfers toners from these stations 31 to 34 to the transfer drum 35. The laser printer 30 can therefore form an image on the recording paper. The recording paper, on which the image data has been printed, is ejected onto an ejected-paper stacker 39.

The paper feed tray section 5 includes a first paper feed tray 51, a second paper feed tray 52, and a third paper feed tray 53. Each of the sheet feed trays 51 to 53 accommodates a recording paper with a wireless tag and a recording paper without a wireless tag. Each of the paper feed trays 51 to 53 each has a detection sensor 54. The detection sensor 54 detects whether or not the recording paper stored in the associated sheet feed tray 51, 52 or 53 has a wireless tag.

Figure 4:
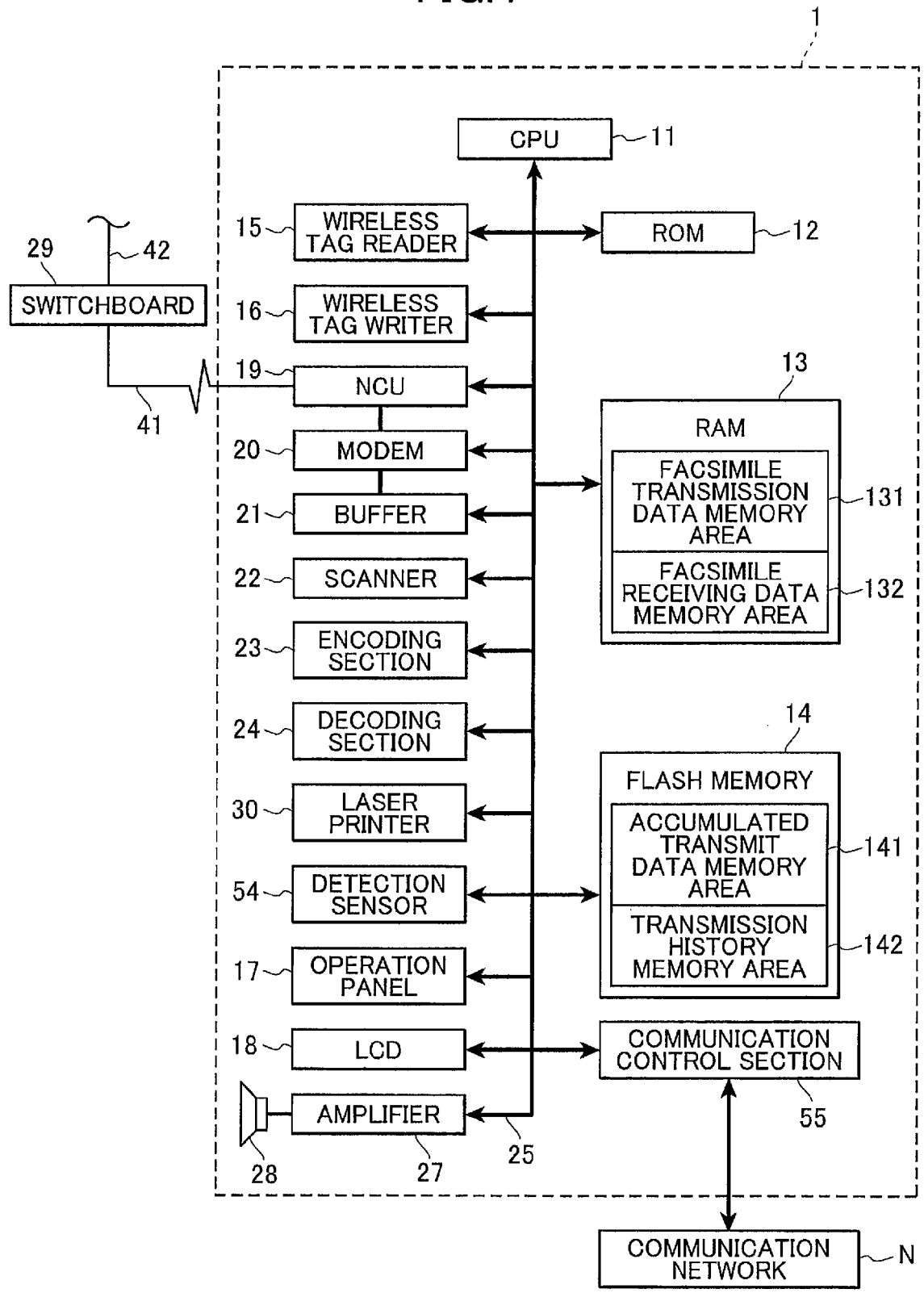
FIG. 4 is a schematic block diagram showing a control system of the facsimile device of FIG. 3.

Next, the configuration of the control system of the facsimile device 1 according to this embodiment will be described in greater detail with reference to FIG. 4. FIG. 4 is a schematic block diagram showing the configuration of the control system of the facsimile device 1. The facsimile device 1 includes a CPU 11, a ROM 12, a RAM 13 and a flash memory 14. These components and various peripheral devices, for example, the network control unit (hereinafter referred as NCU) 19 are connected with one another through a bus line 25. The NCU performs line control.

The CPU 11 of the facsimile device 1 receives and transmits various signals, via the NCU 19, from and to the devices connected to the CPU 11 through the bus line 25, thus performing facsimile operation, i.e., data communication. The ROM 12 is an unrewritable memory and stores the control programs to be executed in the facsimile device 1. The ROM 12 stores various control programs such as the facsimile transmission process program (see FIG. 9), which will be described later.

The RAM 13 is a memory that temporarily stores various data, while the facsimile device 1 is performing operations. The RAM 13 has a facsimile transmission data memory area 131 and a facsimile receiving data memory area 132.

The facsimile transmission data memory area 131 stores facsimile data including image data based on an image on a document read by the scanner 22 for facsimile transmission. The facsimile receiving data memory area 132 temporarily stores received (incoming) facsimile data.

The flash memory 14 is a nonvolatile memory in which data is rewritable. The flash memory 14 has an accumulated transmit data memory area 141 and a transmission history memory area 142. In the case of the "accumulated transmission" in the facsimile transmission, the accumulated transmit data memory area 141 stores the "transmit data" and the "identification data" that are associated with each other.

In the case of the "accumulated transmission", the "transmit data" which is transmitted by way of the communication network N includes first destination specifying data for the facsimile transmission, document data and second destination specifying data for the transmission result notification. The first destination specifying data is data specifying the destination of the facsimile transmission. More specifically, the first destination specifying data indicates the facsimile number of the destination device 60 for the facsimile transmission.

The document data is data of a document transmitted from the information terminal 200 and constitute a major part of the transmit data. When the document data is transmitted to the destination device 60 by the facsimile transmission, the destination device 60 prints an image according to the document data on a recording paper.

The second destination specifying data for the transmission result notification is data of specified destination for "transmission result notification" or "reconfirmation request notification" that is transmitted under predetermined conditions for the "accumulated transmission" in the facsimile transmission. More specifically, the second destination specifying data for the transmission result notification corresponds to "data indicating mail address of transmission requester".

While the second destination specifying data for the transmission result notification corresponds to the "data indicating mail address of transmission requester" in this embodiment as described above, the second destination specifying data is not limited to such data. In other words, if the transmission requestor can receive the "transmission result notification" or the "reconfirmation request notification", the second destination specifying data for the transmission result notification is not limited to the "data indicating mail address of transmission requester". For example, an IP address of the information terminal 200 may be used as the second destination specifying data for the transmission result notification.

When executing the "accumulated transmission", the "identification data" transmitted through the communication network N includes "ID data". The "ID data" are data identifying the transmission requester. In other words, the "identification data (include ID data)" read from the wireless tag 62 of the ID card 61 at the information terminal 200 is transmitted to the facsimile device 1 together with the transmit data and stored in the accumulated transmit data memory area 141.

The transmission history memory area 142 is a memory area for storing transmission history data relating to the facsimile transmission. The transmission history data is generated for each set of transmit data (i.e., for each facsimile transmission) and stored in the transmission history memory area 142.

As shown in FIG. 5, the transmission history data includes registration time information, ID information, first destination information for facsimile transmission, transmitted image data information, second destination information of transmission result notification, and editing (modification) information.

The registration time information is information indicating the time at which the transmit data is transmitted from the information terminal 200. The time indicated by the registration time information may be the time at which the transmit data is received by the facsimile device 1. The ID information is information based on the "identification data" transmitted as the transmit data. More specifically, the ID information is information based on the ID data included in the identification data. The first destination information is information based on the "first destination specifying data." That is, the first destination information indicates the facsimile number and destination name registered with the facsimile number according to the "first destination specifying data" (see FIG. 5).

The second destination information for the transmission result notification is information based on the "second destination specifying data for the transmission result notification" transmitted as the transmit data. Therefore, contents of the second destination information for the transmission result notification in this embodiment is the "mail address of the transmission requestor" specified by the "second destination specifying data for the transmission result notification" (see FIG. 5).

The editing information is information that indicates whether the transmit data have been edited by the transmission operator or not. If the transmit data have been edited (e.g., the facsimile number of the specified destination is modified), the editing information is stored in the transmission history memory area 142.

The facsimile device 1 further includes an NCU 19, a modem 20, a buffer 21, a wireless tag reader 15, a wireless tag writer 16, a scanner 22, an encoding section 23, a decoding section 24, a laser printer 30, detection sensors 54, an operation panel 17, an LCD 18, an amplifier 27 and a communication control section 55 as peripheral devices (see FIG. 4). These peripheral devices are also connected to one another through the bus line 25.

The NCU 19 performs the communication control, such as connecting the line to a switchboard 29 and disconnecting the line from the switchboard 29. The modem 20 modulates or demodulates the facsimile data and transmits the modulated or demodulated facsimile data. The modem 20 also transmits and receives various proceeding signals for transmission control. The buffer 21 temporarily stores encoded facsimile data that is received from and transmits to the destination facsimile devices.

The wireless tag reader 15 is capable of reading the wireless tag data including the identification data, stored on wireless tag, and is operated when reading the ID data from the wireless tag 62 of the "ID card 61 of transmission requester" that the transmission operator has. The wireless tag writer 16 is capable of writing wireless tag data in a wireless tag.

As described above, the scanner 22 is a component of the automatic document feeder 2 and reads data from the documents, one by one, fed from the document mount unit 2A, thereby creating image data for each page of the documents. The encoding section 23 encodes the facsimile data to be transmitted. The decoding section 24 reads received data that are stored in the buffer 21 and decodes the received image data.

As described above, the laser printer 30 prints the image data decoded by the decoder section 24, on a recording paper supplied from any one of the first sheet feed tray 51 through the third sheet feed tray 53. The detection sensors 54 are arranged respectively at the first, second and third sheet feeding trays 51, 52 and 53. Each of the detection sensors 54 detects whether or not the uppermost recording paper stored in the associated sheet feed tray 51, 52 or 53 has a wireless tag.

The operation panel 17 is an operation section that has a plurality of number keys and other keys including the above-mentioned start key. When any one of the keys constituting the operation panel 17 is operated, an input signal is transmitted to the CPU 11. The operation panel 17 is used, for example, to execute an "editing operation (modification operation)" or a "return operation" as will be described in greater detail hereinafter.

The LCD 18 is composed of a liquid crystal display. The LCD 18 can display various screens for showing data sets of the facsimile device 1 based on the control of the CPU 11. For instance, when the destination is specified by using the operation panel 17, the destination facsimile number according to an input by the numerical keys is displayed on the LCD 18. The LCD 18 is capable of accepting a touch panel operation for inputting various information. Whether or not the touch panel works on the LCD 18 is switched depending on the screen being displayed on the LCD 18 in selected mode and condition in which the device operates.

Figure 11:
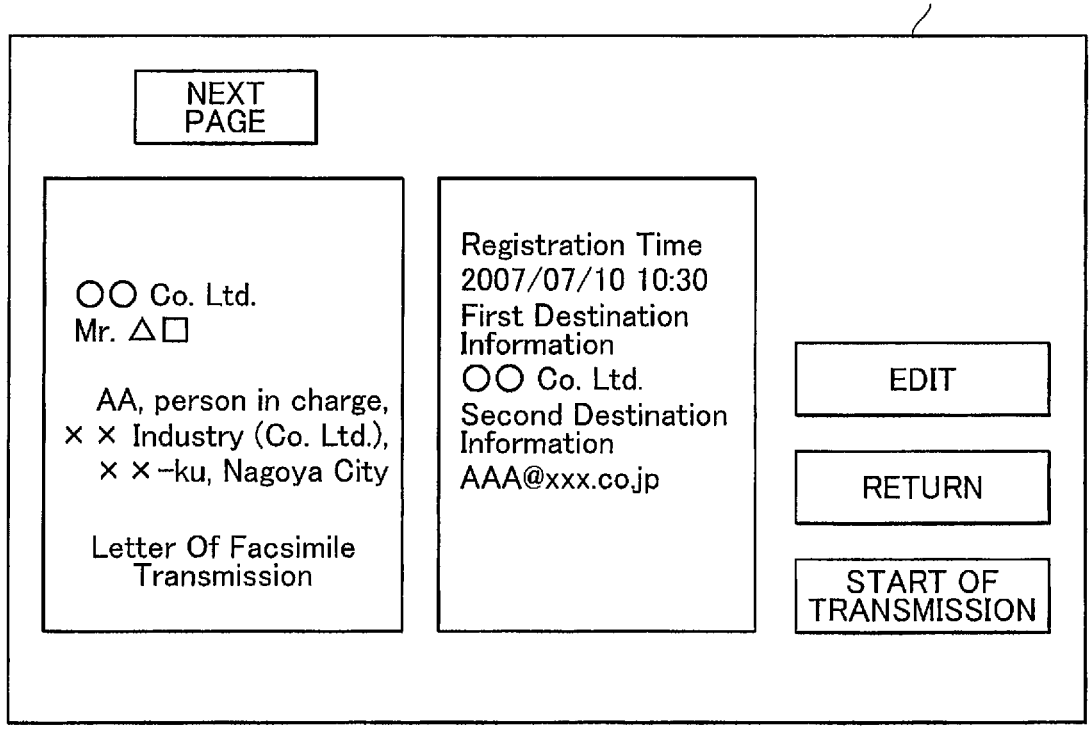
FIG. 11 shows an example of transmit object data content screen according to the embodiment.

When the facsimile device 1 is operating for the "accumulated transmission" in the facsimile transmission, the LCD 18 displays a corresponding data list screen (see FIG. 10) and a transmit object data content screen (see FIG. 11). A corresponding data list and the contents of transmit object data will be described in greater detail hereinafter with reference to drawings.

The amplifier 27 is connected to a speaker 28. The speaker 28 generates a call tone.

Furthermore, the facsimile device 1 is connected to the switchboard 29 through the NCU 19 and a telephone line 41. The switchboard 29 is then connected to a switchboard (not shown) of the destination device 60 through a telephone line 42 and further connected to the destination device 60 through another telephone line (not shown). Thus, the facsimile device 1 can exchange facsimile data with the destination device 60 through the telephone line 41, the switchboard 29, the telephone line 42 and so on.

Figure 6A:
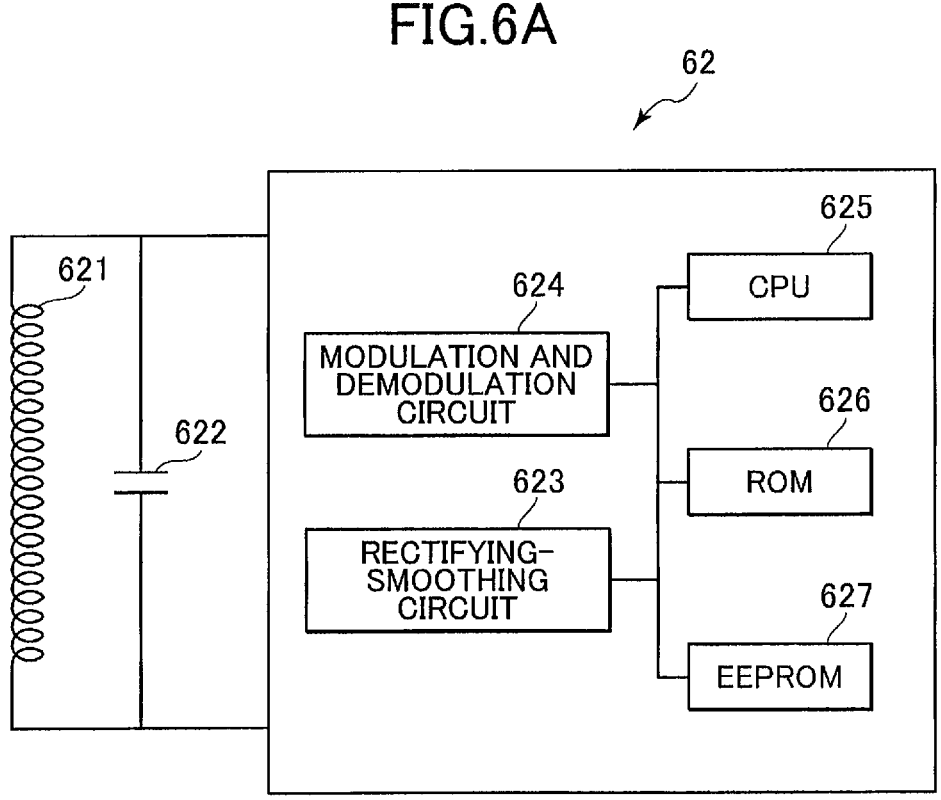
FIG. 6A is a block diagram showing a configuration of a wireless tag.

Next, the configuration of the wireless tag 62 of the ID card 61, that of the wireless tag reader 15, that of the wireless tag writer 16 of the facsimile device 1, and that of the wireless tag reader/writer 230 of the information terminal 200 will be described below in detail with reference to FIGS. 6A and 6B.

Firstly, the configuration of the wireless tag 62 will be described below. As shown in FIG. 6A, the wireless tag 62 includes an antenna coil 621, a resonant capacitor 622, a rectifying-smoothing circuit 623, a modulation and demodulation circuit 624, a CPU 625, a ROM 626 and an EEPROM 627.

The antenna coil 621 is connected in parallel with the resonant capacitor 622. Thus, the antenna coil 621 and the resonant capacitor 622 constitute a resonant circuit. The resonant circuit receives a power source wave having a predetermined high frequency, which has been transmitted from the wireless tag reader 15 or wireless tag writer 16. The resonant circuit supplies a power source wave signal to the rectifying-smoothing circuit 623.

The rectifying-smoothing circuit 623 is a power-supply circuit. The rectifying-smoothing circuit 623 receives a power source wave signal transmitted from the resonant circuit and rectifies and smoothes the power source wave signal, generating DC power at a constant voltage. The DC power is supplied to the CPU 625.

A transmission signal transmitted from the wireless tag reader 15, wireless tag writer 16 or wireless tag reader/writer 230 is superposed on the power source wave signal. The transmission signal is supplied to the modulation and demodulation circuit 724. The modulation and demodulation circuit 724 demodulates the transmission signal. The demodulated signal is supplied to the CPU 725.

The CPU 625 is activated in accordance with the operating program stored in the ROM 626 and performs a prescribed process in response to the demodulated signal supplied from the modulation and demodulation circuit 624. More precisely, the CPU 625 executes a writing process for writing received data as wireless tag data in the EEPROM 627 and a reading process for reading the wireless tag data from the EEPROM 627, demodulating the wireless tag data by the modulation and demodulation circuit 624, and transmitting the demodulated wireless tag data as a wave signal from the antenna coil 621.

Next, the configurations of the wireless tag reader 15 and that of the wireless tag writer 16 of this embodiment will be described with reference to FIG. 6B. FIG. 6B is a block diagram showing the configurations of the wireless tag reader 15 and the wireless tag writer 16.

The wireless tag reader/writer device 230 basically includes a wireless tag reader that has the same configuration of the wireless tag reader 15, and a wireless tag writer that has the configuration structure of the wireless tag writer 16. Therefore, the configuration of the wireless tag reader/writer device 230 will not specifically be described below.

Figure 6B:
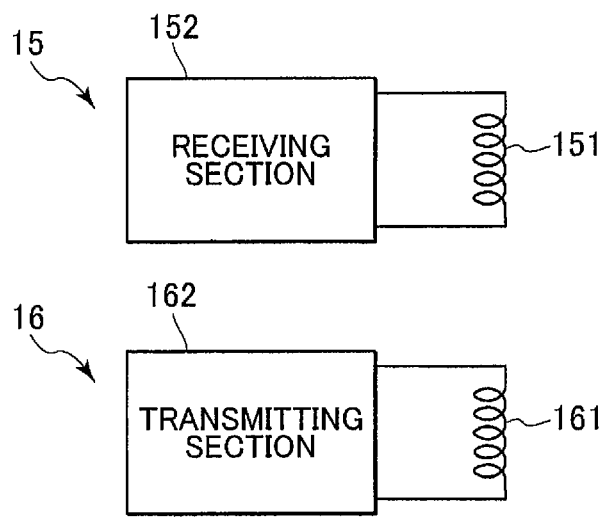
FIG. 6B is a block diagram showing a wireless tag reader and a wireless tag writer.

As shown in FIG. 6B, the wireless tag reader 15 includes a receiving antenna coil 151 and a receiving section 152. Therefore, the wireless tag reader 15 can receive a wave signal transmitted from the wireless tag 62 at the receiving antenna coil 151. The wave signal received at the receiving antenna coil 151 is supplied to the receiving unit 152. The receiving unit 152 demodulates the wave signal, recognizing the wave signal as wireless tag data. As a result, the wireless tag reader 15 can read the wireless tag data from the wireless tag 62.

On the other hand, the wireless tag writer 16 includes a transmission antenna coil 161 and a transmission section 162.

In the wireless tag writer 16, the transmitting unit 162 modulates a carrier signal, generating a power source wave signal, and the transmitting antenna coil 161 transmits the generated power source wave signal. Further, the wireless tag writer 16 can modulate the wireless tag data to be transmit, by the transmitting unit 162, thus superposing the wireless tag data on the power source wave signal, and can transmit the wireless tag data superposed with the power source wave signal from the transmitting antenna coil 161. Thus, the wireless tag writer 16 can write the wireless tag data in the wireless tag 62.

Figure 7:
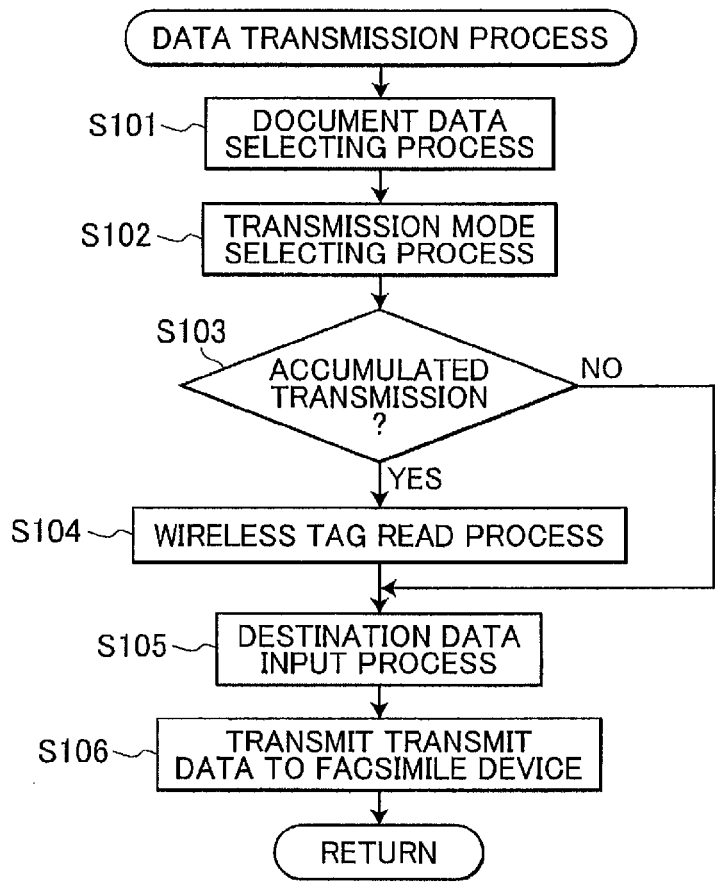
FIG. 7 is a flowchart illustrating steps in the data transmission process program according to the embodiment.

Next, the data transmission process program of the information terminal 200 according to this embodiment will be described below with reference to FIG. 7. FIG. 7 is a flowchart illustrating steps in the data transmission process program. The data transmission process program is executed in both the "ordinary transmission" and the "accumulated transmission." The data transmission process program is executed when the transmit data is transmitted to the destination device 60 for the facsimile transmission by way of the facsimile device 1.

As execution of the data transmission process program is started, in S101 firstly the CPU 212 executes a document data selecting process. In the document data selecting process of S101, one set of document data that forms the transmit data transmitted to the facsimile device 1, is selected from a plurality of sets of document data in the information terminal 200. More specifically, the CPU 212 displays a list of the plurality of sets of document data stored in the RAM 214 or the HDD 215 on the display 216 and identifies the one set of document data according to a data selecting operation of the transmission requestor at the operation section 217. When the one document data set is selected according to the data selecting operation, the CPU 212 ends the document data selecting process of S101 and advance to the transmission mode selecting process of S102.

The list of the document data sets may be displayed in various ways. For example, when a program is executed and the transmission requestor specifies a storage region storing the one document data set on a display screen that is firstly displayed, the title of a plurality of sets of document data that is stored in the storage region may be displayed.

In the transmission mode selecting process of S102, the transmission requester selects either the "ordinary transmission" or the "accumulated transmission" as a transmission mode of the facsimile transmission for the one document data set selected in the document data selecting process of S101. When the transmission requester operates the operation section 217 for selecting either the "ordinary transmission" or the "accumulated transmission," the CPU 212 stores a selected transmission mode by the transmission requester in the RAM 214 and advances to S103. The transmission requester can select either the "ordinary transmission" or the "accumulated transmission" by operating the mouse and choosing one of the transmission modes that are being displayed on the display screen. The transmission mode selecting process may be executed before execution of the document data selecting process of S101.

When the CPU 212 advances to S103, the CPU 212 refers to the RAM 214 and determines whether or not the transmission mode for the facsimile transmission selected in the transmission mode selecting process of S102 is the "accumulated transmission." If the selected transmission mode for the facsimile transmission is the "accumulated transmission" (S103: YES), the CPU 212 advances to a wireless tag read process of S104. On the other hand, if the selected transmission mode for the facsimile transmission is the "ordinary transmission" (S103: NO), the CPU 212 advances to a destination data input process of S105.

The CPU 212 executes the wireless tag read process in S104. In the wireless tag read process of S104, the identification data of the transmission requestor is read from the wireless tag 62 of the ID card 61 by using the wireless tag reader/writer 230 for the "accumulated transmission" in the facsimile transmission. More specifically, the CPU 212 displays a message of "requesting the transmission requester to input the identification data (or the ID data)" on the display 216. When the CPU 212 acquires the "transmission requestor's identification data" from the wireless tag reader/writer 230, the CPU 212 stores the identification data in the RAM 214 and advances to S105.

As the CPU 212 advances to S105, the CPU 212 executes the destination data input process. In the destination data input process of S105, the CPU 212 receives an input of the first destination specifying data that indicate a destination of the facsimile transmission. More specifically, as the transmission requester inputs the first destination specifying data (e.g., the facsimile number of an intended destination) by operating the operation section 217, the CPU 212 stores the input first destination specifying data in the RAM 214.

If the "accumulated transmission" is selected for the current facsimile transmission in S102, the CPU 212 requests the transmission requester to input the "second destination specifying data for the transmission result notification" in the destination data input process (S105). As described above, the second destination specifying data for the transmission result notification is data that specify the information terminal 200 of which the result of the current facsimile transmission in the "accumulated transmission" is notified. In this embodiment, the second destination specifying data for the transmission result notification indicates the "mail address of transmission requester." When the transmission requester inputs the second destination specifying data for the transmission result notification, the CPU 212 stores the input second destination specifying data for the transmission result notification in the RAM 214 and then advances to S106.

In the case of facsimile transmission in the "ordinary transmission," in S105 the CPU 212 ends the destination data input process when the first destination specifying data are input by the transmission requester. Then the CPU 212 advances to S106. Additionally, in the case of the "accumulated transmission" in the facsimile transmission, in S105 the CPU 212 may end the destination data input process without inputting the second destination specifying data for the transmission result notification when the first destination specifying data are input. Thus, the current facsimile transmission can be executed even when the second destination specifying data for the transmission result notification are not input. However, the transmission result of the "accumulated transmission" is not notified to the transmission requester.

As the CPU 212 advances to S106, the CPU 212 transmits to the facsimile device 1 the transmit data including the one document data set selected in the document data selecting process of S101 and the first destination specifying data that is input in destination data input process of S105 through the communication network N.

When the "accumulated transmission" is selected in the transmission mode selecting process of S102, the second destination specifying data for the transmission result notification that is input in the destination specifying data input process of S105, is also included in the transmit data. Further, the identification data that is input in the wireless tag read process of S104, is also transmitted to the facsimile device 1 through the communication network N together with the transmit data. After transmitting the transmit data for the facsimile transmission to the facsimile device 1, the CPU 212 ends the data transmission process program.

Figure 8:
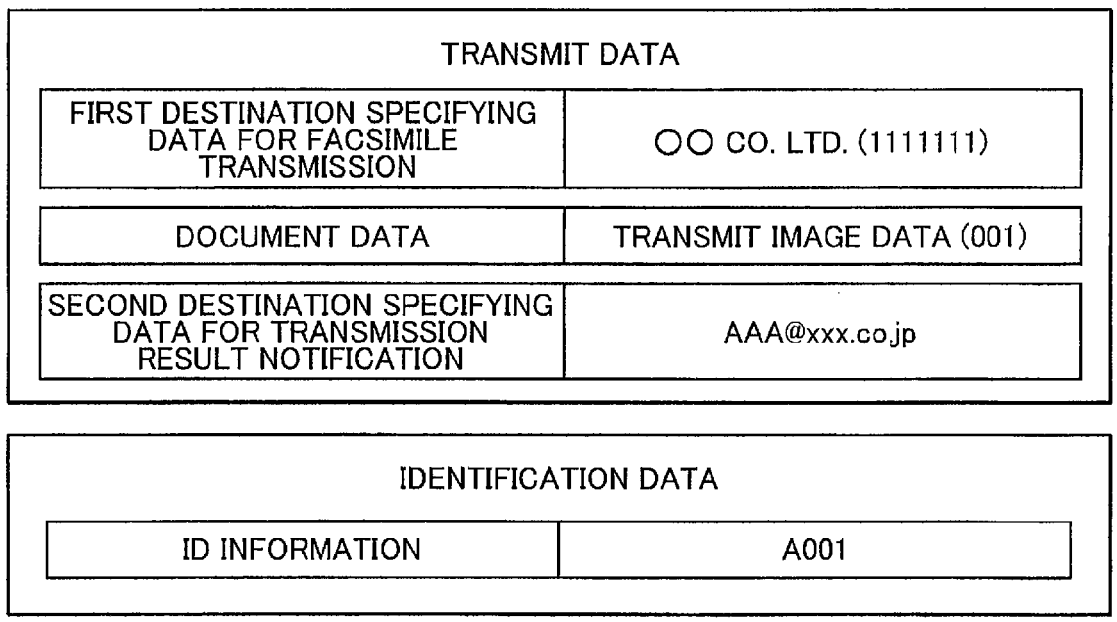
FIG. 8 is an explanatory diagram showing transmit data and identification data for "accumulated transmission"

As shown in FIG. 8, when the "accumulated transmission" is selected, the transmit data including the document data that is "transmitting image data (001)," the first destination specifying data that is "oo Co. Ltd. (Facsimile Number: 1111111), and the second destination specifying data that is "AAA@xxx.co.jp" is transmitted to the facsimile device 1 through the communication network N. At this time, the identification data including the ID data that is "A001" that indicates the transmission requester is also transmitted to the facsimile device 1 through the communication network N together with the transmit data.

The order of executing the wireless tag read process of S104 and the destination data input process of S105 is not limited the above-described order. That is, the destination data input process may be executed first and the wireless tag read process may be executed second. The selection of the "accumulated transmission" in the facsimile transmission may be determined base on the input of the identification data of the transmission requester in the wireless tag read process. In this case, the transmission mode selection process of S102 can be omitted because the transmission mode is automatically determined according to the transmit data with or without the identification data.

When the facsimile device 1 receives the transmit data and other data transmitted from the information terminal 200, the facsimile device 1 executes a process that may vary depending on the transmission mode selected for the transmit data. More specifically, when the "ordinary transmission" is selected as the transmission mode, the CPU 11 of the facsimile device 1 makes a call to the destination device 60 according to the first destination specifying data in the received transmit data. When the line between the facsimile device 1 and the destination device 60 is connected, the CPU 11 executes the facsimile transmission for the document data in the received transmit data.

On the other hand, when the "accumulated transmission" is selected as the transmission mode, the CPU 11 stores the received transmit data in the accumulated transmit data memory area 141 in association with the received identification data. In other words, the CPU 11 stores the document data included in the transmit data, the first destination specifying data, and the second destination specifying data, and the ID data included in the identification data in the accumulated transmit data memory area 141. In this case, the CPU 11 does not immediately start the facsimile transmission to the destination device 60 but stands by until the transmission operator executes the facsimile transmission.

Figure 9:
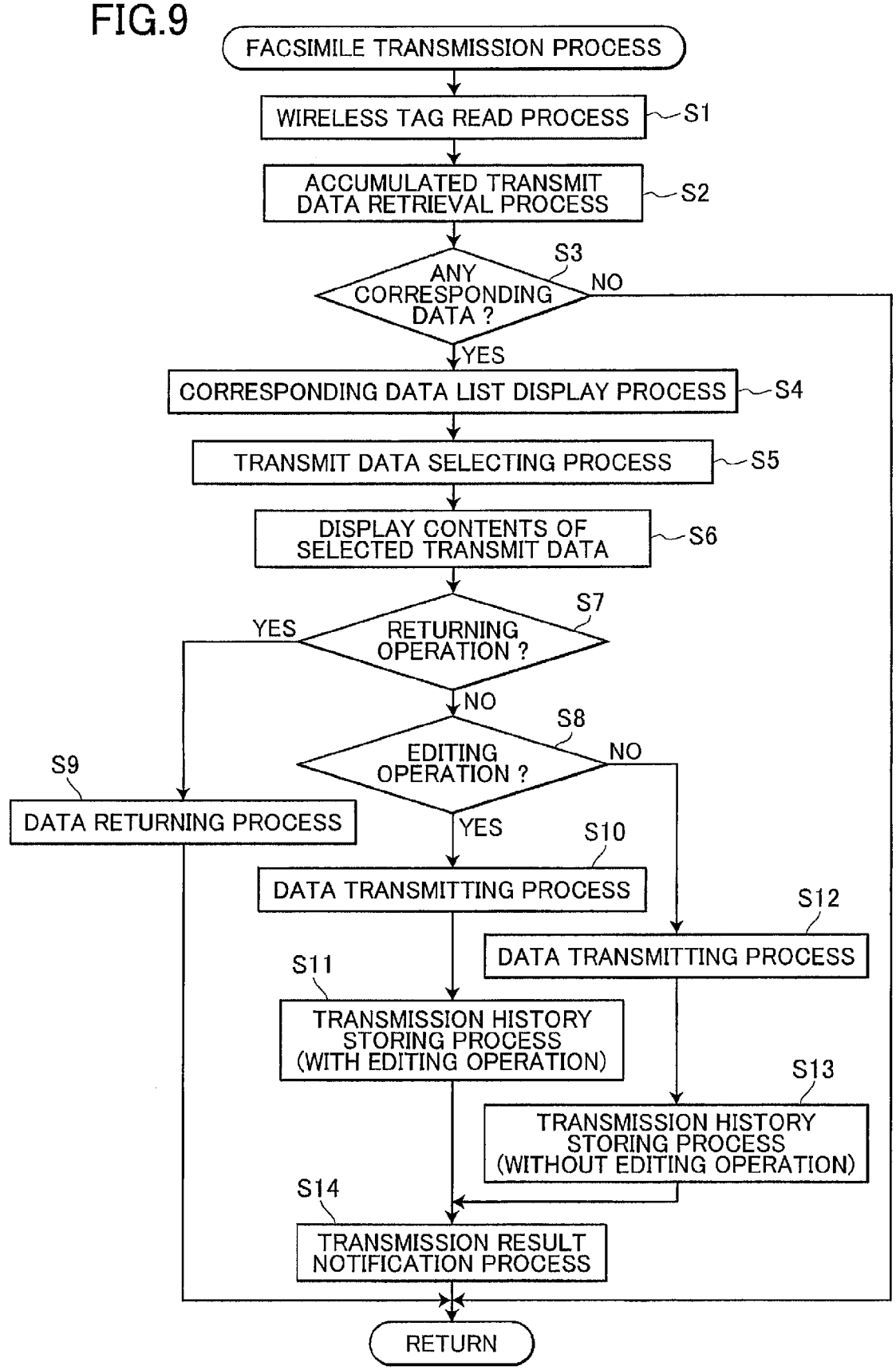
FIG. 9 is a flowchart illustrating steps of a facsimile transmission process program according to the embodiment.

Next, the facsimile transmission process program that is executed in the facsimile device 1 will be described in detail with reference FIG. 9. FIG. 9 is a flowchart illustrating steps of the facsimile transmission process program. This facsimile transmission process program is executed when the transmission operator operates to transmit the transmit data in the "accumulated transmission."

The following explanation of the facsimile transmission process program is based on the assumption that the transmission requester has already transmitted the transmit data in the "accumulated transmission" and the identification data to the facsimile device 1. Further, the following explanation is based on the assumption that the transmission requester has already handed over the ID card 61 to the transmission operator and a plurality of sets of transmit data and a plurality of sets of identification data are stored in the accumulated transmit data memory area 141.

When the execution of the facsimile transmission process program is started, the CPU 11 executes a wireless tag read process of S1. More specifically, the CPU 11 displays a message of "requesting transmission operator to input identification data" on the LCD 18. Then, the transmission operator reads the identification data stored in the wireless tag 62 of the ID card 61 of the transmission requester by the wireless tag reader 15.

When the CPU 11 acquires the identification data from the wireless tag 62 of the ID card 61, the CPU 11 stores the acquired identification data in the RAM 13 and subsequently advances to the accumulated transmit data retrieval process of S2.

When the CPU 11 advance to the accumulated transmit data retrieval process of S2, the CPU 11 refers to data stored in the accumulated transmit data memory area 141 and retrieves the transmit data that is associated with identification data in correspondence with the acquired identification data in the wireless tag read process of S1. Then, the CPU 11 extracts all the "corresponding data" stored in the accumulated transmit data memory area 141. The "corresponding data" is the transmit data that is associated with identification data in correspondence with the acquired identification data. When the processes of retrieving and extracting all the "corresponding data" stored in the accumulated transmit data memory area 141 ends, the CPU 11 advances to S3.

In S3 the CPU 11 determines whether or not any "corresponding data" is retrieved based on a retrieval result of the accumulated transmit data retrieval process of S2. If any "corresponding data" is retrieved (S3; YES), the CPU 11 advances to a corresponding data list display process of S4. On the other hand, if any "corresponding data" is not retrieved (S3: NO), the transmit data that the transmission requester intended do not stored in the accumulated transmit data memory area 141 so that the requested facsimile transmission cannot be executed. In this case (S3: NO), the CPU 11 simply ends the facsimile transmission process program. The CPU 11 may be so adapted as to display a message that any corresponding data is not stored, on the LCD 18 so as to notify the transmission operator of the fact that there are no any corresponding data.

In S4 the CPU 11 executes the corresponding data list display process. In this corresponding data list display process of S4, as shown in FIG. 10, the CPU 11 displays a corresponding data list screen on the LCD 18. After displaying the corresponding data list screen, the CPU 11 advances to the transmit data selection process of S5.

Here, the corresponding data list display process of S4 will be described in detail below with reference to FIG. 10. FIG. 10 is a schematic illustration of an example of the corresponding data list screen.

In the corresponding data list display process of S4, the corresponding data list screen is a list screen displaying all the "corresponding data" extracted in the accumulated transmit data retrieval process of S2.

For example, when the transmission requester "A" requests the transmission operator to execute the "accumulated transmission" in the facsimile transmission, the transmission requester "A" hands over the ID card 61 thereof to the transmission operator. Then, the transmission operator executes the facsimile transmission at the facsimile device 1 for the transmission requester "A". Thus, the transmission operator inputs the identification data indicating the transmission requester "A" (i.e., the ID data "A001" shown in FIG. 8) to the facsimile device 1 through the wireless tag reader 15.

Therefore, the CPU 11 retrieves the transmit data that is associated with the ID data "A001" from the accumulated transmit data memory area 141. In other words, the CPU 11 extracts all the transmit data (all the corresponding data for the ID data "A001") that are associated with the identification data that corresponds to the ID data "A001" from the plurality of sets of transmit data and the plurality of sets of identification data stored in the accumulated transmit data memory area 141.

Then, as shown in FIG. 10, the CPU 11 displays on the LCD 18 the corresponding data list including registration time information, ID information, first destination information for the facsimile transmission, and second destination information for the transmission result notification. The registration time information indicates a time when the transmit data is transmitted to the facsimile device 1. The ID information indicates the identification data (ID data) associated with the transmit data. More specifically, the information of "A001" corresponds to the ID information in this instance. The first destination information for the facsimile transmission indicates the "first destination specifying data for the facsimile transmission" transmitted to the facsimile device 1 as the transmit data (e.g., the name of the destination or the facsimile number of the destination). The second destination information for the transmission result notification indicates the "second destination specifying data for the transmission result notification" transmitted to the facsimile device 1 as the transmit data (the mail address AAA@xxx.co.jp of the transmission requestor in this instance).

When the corresponding data list display process of S4 ends, the CPU 11 executes the transmit data selecting process of S5. In the transmit data selecting process of S5, the transmit data to be transmitted to a predetermined destination in the current facsimile transmission is selected from the corresponding data list. Therefore, the CPU 11 identifies the selected transmit data (transmit object data) in the corresponding data list according to an operation signal from the operation panel 17. The CPU 11 advances to S6 after the transmit object data are selected as a result of the operation at the operation panel 17.

In S6 the CPU 11 displays on the LCD 18 the transmit object data content screen that specifically shows contents of the transmit object data. After displaying the contents of the transmit object data on the LCD 18, the CPU 11 advances to S7.

Next, the transmit object data content screen displayed on the LCD 18 in S6 will be described in detail with reference to FIG. 11. As shown in FIG. 11, concrete content of document data of the transmit object data and detail information of the transmit object data are displayed in the transmit object data content screen. More specifically, an image based on the document data included in the transmit data corresponding to the transmit object data is displayed on a page-by-page basis in the transmit object data content screen (see the left side part in FIG. 11). The registration time information, the first destination information for the facsimile transmission, and the second destination information for the transmission result notification are also displayed as the detail information in the transmit object data content screen (see the right side part in FIG. 11).

When the transmit object data content screen is displayed on the LCD 18, the transmission operator can check the specific contents of the transmit object data. More specifically, since the image based on the document data of the transmit object data is displayed, the transmission operator can check whether the document data is appropriate or not and hence satisfactorily implement information management. Additionally, since the registration time information, the first destination information for the facsimile transmission, and the second destination information for the transmission result notification are displayed as the detail information for the transmit object data, the transmission operator can detect setting errors of the first destination information for the facsimile transmission by the transmission requestor, thereby eliminating any transmitting error of the transmit object data reliably. For example, since a setting error of the first destination information for the facsimile transmission can be detected before the facsimile transmission if there is the setting error in the first destination specifying data for facsimile transmission input by the transmission requester, transmission error can be reliably prevented.

Additionally, as shown in FIG. 11, a plurality of options is displayed in the transmit object data content screen. In this embodiment, three options including "edit", "return" and "start of transmission" are displayed in the transmit object data content screen. The option of "start of transmission" is selected when the transmit data corresponding to the transmit object data is transmitted to the destination device 60 according to the first destination specifying data for the facsimile transmission. Therefore, when the option of "start of transmission" is selected, the facsimile device 1 transmits the transmit object data to the destination device 60.

The option of "edit" is selected when the transmission operator edits the contents of the transmit object data. For example, when the first destination information of the facsimile transmission for the transmit object data has an error, the transmission operator can edit and modify the first destination information for the facsimile transmission by selecting the option of "edit." For example, after the transmission operator presses a part displaying the detail information on the LCD 18 and selects the option of "edit," a display screen for inputting a first destination information is displayed on the LCD 18 and the transmission operator inputs a correct destination.

The option of "return" is selected when the transmit data corresponding to the transmit object data is returned to the transmission requester. For example, when the transmission operator checks the contents of the transmit object data and finds an error that the transmission operator cannot correct, in the transmit object data, the transmission operator selects the option of "return" in order to return the transmit object data and the identification data to the transmission requester. Thus, the transmission requester check the transmit object data once again and correct the error.

In S7 the CPU 11 determines whether or not a "return operation" for the transmit object data is performed. The "return operation" has an operation of selecting the option of "return" and a series of operations that follows the "return" selecting operation. Thus, in S7 the CPU 11 determines whether or not the "return operation" is performed according to the operation signal from the LCD 18 (the operation panel 17).

When no "return operation" is performed (S7: NO), the CPU 11 advances to S8. When, on the other hand, the "return operation" is performed (S7: YES), the CPU 11 advances to a data returning process of S9.

When the CPU 11 advances to the data returning process of S9, the CPU 11 returns the transmit data corresponding to the transmit object data and the identification data to the transmission requester and sends a message of "requesting to check the contents of the transmitting object" to the transmission requester. In this embodiment, the CPU 11 transmits a message that "This transmit object data contains an uncorrectable error. Please check the contents of the transmit data." by e-mail to the mail address of the transmission requester contained in the second destination specifying data for the transmission result notification. This e-mail corresponds to the "reconfirmation request notification."

Then, the transmit object data and the identification data that are subjected to the "return operation" are attached to the e-mail. Since the transmit object data and the identification data are transmitted with the e-mail corresponding to "reconfirmation request notification", the transmit object data and the identification data are no longer stored in the accumulated transmit data memory area 141. That is, the transmit object data and the identification data are deleted from the accumulated transmit data memory area 141 in the "return operation."

Then, as a result, the e-mail that corresponds to the "reconfirmation request notification" and to which the transmit data having an error is attached, is transmitted to the mail address of the transmission requester (or the information terminal 200 of the transmission requester) through the mail server 300. When the transmission requester receives the returned transmit data together with the e-mail that corresponds to the "reconfirmation request notification," the transmission requester can check the returned transmit data and correct the error. The transmission requester corrects the transmit data in a transmit data correcting process program that is executed in the information terminal 200. The transmit data correcting process program will be described in greater detail hereinafter.

After returning the above-described e-mail that corresponds to the "reconfirmation request notification" to the mail address specified in the second destination specifying data for the destination result notification, the CPU 11 ends the facsimile transmission process program. Therefore, in this case, the transmit object data have not been transmitted to the destination device 60 specified by the first destination specifying data for the facsimile transmission.

When no "return operation" is executed and the process advances to S8, then the CPU 11 determines whether or not an "edit operation" has been executed. The "edit operation" is an operation of selecting the option of "edit" and a series of operations that follows the edit operation. Therefore, for example, the "edit operation" is executed when the specified destination (e.g., the facsimile number) of the first destination specifying data for the facsimile transmission included in the transmit object data contains an error. In this case, the "edit operation" includes an operation of selecting the option of "edit" and an operation of inputting the correct destination.

When the "edit operation" is executed (S8: YES), the CPU 11 executes the data transmission process of S10. In the data transmission process of S10, the CPU 11 transmits the transmit data corresponding to the transmit object data to the destination device 60 that is currently specified destination in the first destination specifying data for the facsimile transmission (namely a corrected destination specifying data if the first destination specifying data for the facsimile transmission is corrected in the "edit operation"). As a result, in the facsimile device 1, the transmission operator can correct the error that existed when the transmit data is sent from the transmission requester to the facsimile device 1, and hence can prevent any transmission error (e.g., the facsimile transmission of the transmit data to an unintended destination). After the transmit object data is transmitted to the destination device 60, the CPU 11 advances to a transmission history storing process of S11.

In the transmission history storing process of S11, the CPU 11 stores, in the transmission history memory area 142, various sets of information (the detail information (e.g., the registration time information and the first destination information for the facsimile transmission)) of the transmit object data that have already been transmitted to the destination device 60 as a result of the data transmitting process of S10.

When the CPU 11 advances to the transmission history storing process of S11, the "edit operation" has been preformed on the transmit object data transmitted in the data transmitting process of S10 (S8: YES). Therefore, the CPU 11 adds first editing information, indicating that the transmit object data has been edited (modified, hereinafter refer to as "edited"), to the transmission history data for the transmit object data and stores the transmitting history data with the first editing information indicating "edited" in the transmission history memory area 142. After storing the transmission history data including the first editing information indicating "edited" in the transmission history memory area 142, the CPU 11 advances to the transmission result notification process of S14.

On the other hand, when no "editing operation" has been performed on the transmit object data (S8: NO), the CPU 11 advances to the data transmitting process of S12. In this case, since the transmit object data is not edited, the CPU 11 simply transmits the transmit object data to the destination device 60 specified by the transmission requester. In other words, the data transmitting process of S12 is executed when the transmission operator determines that the transmit object data prepared by the transmission requester does not include any error. After transmitting the transmit object data to the destination device 60, the CPU 11 advances to the transmission history storing process of S13.

When the CPU 11 advances to the transmission history storing process of S13, the CPU 11 stores the transmission history data, that relates to the transmit object data that have already been transmitted as a result of the data transmitting process of S12, in the transmission history memory area 142. The transmission history storing process of S13 is basically same as the process of S11. In other words, in the transmission history storing process of S13, the detail information (e.g., the registration time information, the destination information and so on) for the transmit object data that have already been transmitted is stored in the transmission history memory area 142.

However, when the CPU 11 advances to the transmission history storing process of S13, no "editing operation" is performed on the transmit object data transmitted as a result of the data transmitting process of S12 (S8: NO). Therefore, unlike in the case of Sit, the CPU adds second editing information, indicating that the transmit object data has not been edited (hereinafter refer to as "not edited"), to the transmission history data for the transmit object data and stores the transmitting history data with the second editing information indicating "not edited" in the transmission history memory area 142. After storing the transmission history data including the second editing information indicating "not edited" in the transmission history memory area 142, the CPU 11 advances to the transmission result notification process of S14. Note that the second editing information indicating "not edited" is not indispensable.

When the CPU 11 advances to the transmission result notification process of S14, the CPU 11 transmits an e-mail containing a completion message of, for example, "the facsimile transmission relating to the transmit object data of the registration time "10:30" and the first destination information "oo Co. Ltd." has been completed" to the mail address of the transmission requester specified in the second destination specifying data for the transmission result notification. Thus, the e-mail of this instance corresponds to the "transmission completion notification."

When the CPU 11 advances from the transmission history storing program of S11 to the transmission result notification process of S14, the CPU 11 transmits the e-mail after adding an additional message that identifies a part of the transmit object data that is changed in the "editing operation" by the transmission operator, to the completion message. For example, when the facsimile number of the destination in the first destination specifying data is changed by the transmission operator, the "facsimile number specified by the transmission requester" and the "facsimile number changed by the transmission operator" are added to the completion message before the e-mail is transmitted. After transmitting the e-mail of the "transmission completion notification" to the mail address of the transmission requestor, the CPU 11 ends the facsimile transmission process program.

The transmission requester can confirm that the facsimile transmission of the transmit object data that the transmission requester requested has been completed when the e-mail of the "transmission completion notification" is transmitted to the transmission requester. Additionally, if the transmission operator executed an editing operation, the transmission requester can confirm the alteration by the editing operation by reading the e-mail. Thus, the transmission requester can confirm the error in the transmit object data created by the transmission requester and hence the error that the transmission requester confirmed is useful for creating transmit data and issuing a request for the created transmit data next time. In other words, the transmission requester can be expected to create the transmit data without an error from the beginning of facsimile transmission. Therefore, a workload of the transmission operator and a transmission error of facsimile transmission can be reduced.

Figure 12:
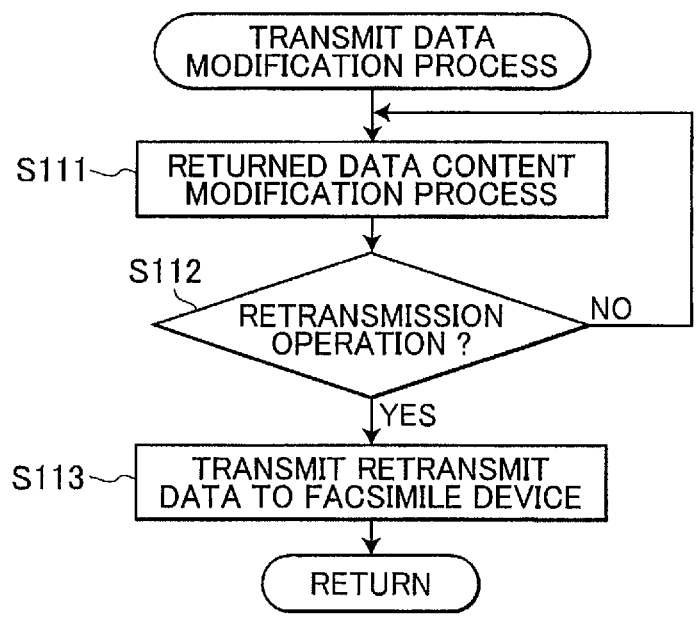
FIG. 12 is a flowchart illustrating steps in the transmit data modification process program according to the embodiment.

Next, the transmit data modification process program that the information terminal 200 executes will be described in detail with reference FIG. 12. FIG. 12 is a flowchart illustrating steps in the transmit data modification process program.

As described above, in the data returning process of S9, an e-mail corresponding to the "reconfirmation request notification" is transmitted to the information terminal 200. Thus, the information terminal 200 receives the e-mail corresponding to the "reconfirmation request notification" transmitted in the data returning process of S9. The received e-mail includes the transmit data (the transmit object data) attached to the e-mail (hereinafter referred to as returned data). The CPU 212 of the information terminal 200 receives the returned data together with the received e-mail.

Then, the CPU 212 displays contents of the e-mail corresponding to the received "reconfirmation request notification" and also contents of the returned data on the display 216 according to the transmitting requestor's operation. In other wards, the CPU 212 displays the image based on the document data included in the returned data and also the contents of the first destination specifying data for the facsimile transmission (e.g., the facsimile number) also included in the returned data. Therefore, the transmitting requester can confirm the contents of the returned data being displayed on the display 216 and determine whether the returned data need to be modified.

The transmit data modification process program is executed by the CPU 212 of the information terminal 200 according to the operation of the transmission requester who checks the contents of the returned data and determines that the returned data need to be modified.

When the transmit data modification process program is started according to the transmission requestor's operation, in S111 the CPU 212 firstly executes a returned data content modifying process as shown in FIG. 12. In the returned data content modifying process, the CPU 212 modifies the document data and the first destination specifying data for the facsimile transmission in the returned data according to the operation performed at the operation section 217 by the transmission requester.

In S112 the CPU 212 determines whether or not a "retransmission operation" is performed according to an operation signal from the operation section 217. The "retransmission operation" is executed by means of the operation section 217 when the returned data or the modified returned data is transmitted again in the "accumulated transmission" of the facsimile transmission. When a "retransmission operation" is executed (S112: YES), the CPU 212 advances to S113. On the other hand, when no "retransmission operation" is executed (S112: NO), the CPU 212 returns to the returned data content modifying process of S111.

As a result, the transmission requester can modify the contents of the returned data until executing a "retransmission operation."

In S113 the CPU 212 transmits retransmit data to the facsimile device 1 through the communication network N. The retransmit data include the returned data or the modified returned data at the time of executing the "retransmission operation" and the identification data associated and returned with the returned data. Additionally, the retransmit data include retransmission information indicating that data transmitted from the information terminal 200 includes the retransmit data. The facsimile device 1 that receives the retransmit data can recognize the "accumulated transmission" according to the retransmission information. Then, when the retransmit data are transmitted to the facsimile device 1 through the communication network N, the CPU 212 ends the transmit data modification process program.

When the facsimile device 1 receives the retransmit data as a result of the "retransmission operation", the facsimile device 1 accumulates and stores the received retransmit data in the accumulated transmit data memory area 141 in accordance with the fact that the received retransmit data contain the retransmission information. As a result, the accumulated transmit data memory area 141 stores the returned data or the modified returned data at the time of executing the "retransmission operation" in association with the identification data that are associated and returned with the returned data. The CPU 11 of the facsimile device 1 may determine that the received retransmit data is the retransmit data for the "accumulated transmission" based on the identification data included therein.

Therefore, when the facsimile device 1 executes the facsimile transmission process program, the transmission operator can check the contents of the retransmit data and transmit the retransmit data to the destination device 60 by facsimile transmission. In this case again, the contents of the retransmit data are checked by the transmission operator to eliminate any transmission error in the facsimile transmission.

As described above in detail, with the facsimile device 1 and the communication system 100 of this embodiment, the contents of the transmit data are displayed on the transmit object data content screen in the LCD 18 (see FIG. 11) so that the transmission operator can check the specific contents of the transmit data. More specifically, the contents of the transmit data can be confirm not only when the transmit data is transmitted to the facsimile device 1 by the transmission requester but also when the transmit data is actually transmitted to the destination device 60 by the transmission operator. In other words, the transmit data can be confirmed not less than twice so that any transmission error such as an error in the specified destination can be reliably eliminated when transmitting the transmit data.

Additionally, when the transmission requester and the transmission operator are different from each other, two persons participate in the operation of checking the contents of the transmit data to guarantee the objectivity of judgment. In other words, with the facsimile device 1 and the communication system 100, the transmission error that may arise from misconception if the transmission requester and the transmission operator are a same person can be avoided.

Furthermore, with the facsimile device 1 and the communication system 100 of this embodiment, the transmit data transmitted from the information terminal 200 are accumulated and stored in the accumulated transmit data memory area 141 of the facsimile device 1. As a result, the transmission operator can execute the transmitting operation of the transmit data by the facsimile transmission almost free of time limit. In other words, the time limit on the transmitting operation of the transmit data is alleviated so that the transmission operator can improve the operating efficiency.

Still additionally, the accumulated transmit data memory area 141 stores the identification data and the transmit data in association with each other. Then, by using the ID card 61, the facsimile device 1 can extract all the corresponding data relating to the transmission requestor who has the ID card 61 from the accumulated transmit data memory are 141 and display the corresponding data list (see FIG. 10) on the LCD 18. Then, as a result, the transmission operator can easily find out the transmit data requested by the transmission requestor to transmit. Thus, according to this embodiment, the transmitting operation of the transmit data can be quickly started, thereby improving the operating efficiency of the transmission operator.

Further, the identification data includes the ID data by which an individual can be identified. In other words, the transmission requestor can be identified by the identification data. Then, as a result, all the transmit data corresponding to the individual (transmission requester) identified by the ID data can be extracted from the accumulated transmit data memory area 141 so that the transmit data to be actually transmitted can be identified with ease, thereby improving the operating efficiency of the transmission operator.

With the facsimile device 1 and the communication system 100 of this embodiment, when the transmit data being displayed on the transmit object data content screen contains an error, the error in the transmit data can be removed by executing the "editing operation". More specifically, when the transmission operator finds the error, the transmission operator can quickly correct the error (e.g., the error in the specified destination) so that, with the facsimile device 1 and the communication system 100, the operating efficiency of transmitting the transmit data can be further improved.

When the transmit data is edited, the edited data (the editing information) is stored in the transmission history memory area 142 for the transmission history data relating to the transmit data. Accordingly, the transmission operator can confirm whether or not the transmit data have been edited by seeing the contents of the transmission history memory area 142, thereby successfully managing the operation of facsimile transmission.

Additionally, with the facsimile device 1 and the communication system 100 of this embodiment, when the transmit data being displayed on the transmit object data content screen contains an error that the transmission operator cannot modify, the transmit data can be returned to the information terminal 200 by executing the "return operation." Then, the returned transmit data is modified at the information terminal 200 by the transmission requester (see FIG. 12).

As a result, the transmit data containing the error is returned before the transmit data is transmitted to the destination device 60 and is actually transmitted to the destination device 60 only after the correction of the error. Therefore, with the facsimile device 1 and the communication system 100, any transmit data that contain an error is not transmitted to the destination device so that any transmission error can be reliably prevented.

Additionally, with the facsimile device 1 and the communication system 100, the result notification of the facsimile transmission for the transmit data is transmitted to the information terminal 200 specified in the second destination specifying data for the transmission result notification. Therefore, the transmission requestor can confirm the transmission result of the transmit data that the transmission requester requested so that the transmission requester can appropriately and quickly adapt to the transmission result.

When, for example, the transmit data are returned by a "return operation" executed at the facsimile device 1, the transmission requester can confirm that the transmit data have been returned and need to be checked once again by the "reconfirmation request notification." Thus, the transmission requestor can quickly check and modify the contents of the returned transmit data. When, on the other hand, the transmission of the transmit data is normally completed, the transmission requester can confirm that the transmission is completed normally and hence can quickly adapt to the post transmission operation.

While the invention has been described in detail with reference to specific embodiments thereof, it would be apparent to those skilled in the art that many modifications and variations may be made therein without departing from the spirit of the invention, the scope of which is defined by the attached claims.

While the transmit data and the identification data of the transmit data that are returned by a "return operation" are deleted from the accumulated transmit data memory area 141 in the above-described embodiment, this invention is not limited to the above embodiment.

For example, a "copy of the transmit data" may be returned for the operation of returning the transmit data and the identification data so that the transmit data may remain accumulated and stored in the accumulated transmit data memory area 141. Then, when the retransmit data produced by modifying the transmit data is received, the transmit data stored in the accumulated transmit data memory area 141 may be erased and the retransmit data may be associated with the identification data with which the unmodified (erased) transmit data have been associated.

While the information terminal 200 does not execute a special process when the information terminal 200 receives the e-mail relating to the "transmission completion notification" or the "reconfirmation request notification", the information terminal 200 may discriminate the reception of the e-mail relating to the "transmission completion notification" or the "reconfirmation request notification" from the reception of any ordinary e-mail. Therefore, the transmission requester can reliably confirm any "notification relating to facsimile transmission" and adapt to the notification.

When the transmit data is returned by the "return operation", the transmit data is attached to the e-mail of the "reconfirmation request notification" and returned to the information terminal 200 in the above-described embodiment.

However, this invention is not limited to the above embodiment. For example, the "transmit data for the return operation" and the e-mail of the "reconfirmation request notification" may be transmitted separately and independently or only the "transmit data for the return operation" may be transmitted so that the e-mail of the "reconfirmation request notification" may not be transmitted.

Furthermore, an ID specific to the transmission operator may be employed as the identification data that correspond to the transmit data. With such an arrangement, the transmit data to be checked can be extracted from the accumulated transmit data by means of the transmission operator's ID card. In the above embodiment, the wireless tag data only includes the identification data. However, the wireless tag data may include another data other than the identification data.

What is claimed is:

1. A communication device comprising:
a first tag data reading unit configured to read tag data from a wireless tag, the tag data being written therein;
a storing unit configured to store transmit data and identification data in association with each other;
a first determination unit configured to determine whether the tag data corresponds to the identification data stored in the storing unit before the first tag data reading unit reads the tag data;
an extracting unit configured to extract from the storing unit the transmit data in association with the identification data when the first determination unit determines that the tag data corresponds to the identification data;
a display unit configured to display contents of the transmit data that is extracted by the extracting unit when the first determination unit determines that the tag data corresponds to the identification data stored in the storing unit before the first tag data reading unit reads the tag data;
a second determination unit configured to determine whether a transmission instruction is input for the transmit data that is extracted by the extracting unit when the first determination unit determines that the tag data corresponds to the identification data stored in the storing unit before the first tag data reading unit reads the tag data and is displayed on the display unit; and
a transmitting unit configured to transmit to a destination device the transmit data that is extracted by the extracting unit when the first determination unit determines that the tag data corresponds to the identification data stored in the storing unit before the first tag data reading unit reads the tag data and is displayed on the display unit when the second determination unit determines that the transmission instruction is input.

2. The communication device according to claim 1, wherein the transmit data comprises document data and first destination specifying data that specifies the destination device,
wherein the display unit is configured to display an image based on the document data and destination information based on the first destination specifying data, and
wherein the communication device further comprises:
a modification operating unit; and
a modification unit configured to modify the contents of the transmit data displayed on the display unit based on a modification operation at the modification operating unit.

3. The communication device according to claim 2, further comprising:
a transmission history storing unit configured to store transmission history data based on a transmitting operation by the transmitting unit, the transmission history data comprising transmission destination data indicating the destination device and time data indicating a time when the transmit data is transmitted to the destination device; and
a transmission history storing control unit configured to control the transmission history storing unit to store modification executed data together with the transmission history data, the modification executed data indicating that the transmit data is modified by the modification unit if the modification unit modifies the transmit data.

4. The communication device according to claim 1,
wherein the storing unit is configured to store a plurality of sets of transmit data and a plurality of sets of identification data, the plurality of sets of transmit data being in one-to-one association with the plurality of sets of identification data,
wherein the tag data comprises individual specifying data that specifies an individual in association with the wireless tag, and
wherein the extracting unit is configured to extract from the storing unit all sets of transmit data associated with the identification data in correspondence with the individual specifying data when the first tag data reading unit reads the individual specifying data.

5. The communication device according to claim 4, further comprising a selecting unit, and
wherein the display unit is configured to display the all sets of transmit data extracted by the extracting unit,
wherein the selecting unit is configured to select one set of transmit data from the all sets of transmit data, and
wherein the transmitting unit is configured to transmit the one set of transmit data to the destination device.

6. The communication device according to claim 5, wherein the transmit data comprises second destination specifying data specifying the information terminal that receives a transmission result of the transmit data transmitted to the destination device.

7. The communication device according to claim 1, further comprising a communication unit configured to communicate with an information terminal through a communication network, the transmit data being transmitted from the information terminal to the communication unit and being stored in the storing unit.

8. The communication device according to claim 7, further comprising:
a return operating unit; and
a return unit configured to return the transmit data to the information terminal based on a return operation at the return operating unit.

9. The communication device according to claim 7, further comprising a notification transmitting unit configured to transmit a transmission result of the transmit data transmitted to the destination device, to the information terminal.

10. The communication device according to claim 9, further comprising a first notification transmission control unit configured to control, when the transmitting unit transmits the transmit data to the destination device, the notification transmitting unit to notify, to the information terminal through the communication network, a transmission completion notification indicating that the transmit data has been transmitted to the destination device.

11. The communication device according to claim 9, further comprising:
a return operating unit; and a return unit configured to return the transmit data to the information terminal based on a return operation on the return operating unit.

12. The communication device according to claim 11, further comprising a second notification transmission control unit configured to control, when the return unit returns the transmit data to the information terminal, the notification transmitting unit to notify, to the information terminal through the communication network, a reconfirmation request notification that indicates a request to confirm the contents of the transmit data returned by the return unit.

13. A communication system comprising:
an information terminal; and
a communication device configured to communicate with the information terminal through a communication network,
wherein the information terminal comprises:
   a designation unit configured to designate document data; and
   a first transmitting unit configured to transmit to the communication device identification data and transmit data comprising the document data and destination specifying data that specifies a destination device, the identification data being in association with the transmit data, and
wherein the communication device comprises:
   a first tag data reading unit configured to read tag data from a wireless tag, the tag data being written therein;
   a storing unit configured to store the transmit data and the identification data in association with each other;
   a first determination unit configured to determine whether the tag data corresponds to the identification data transmitted from the first transmitting unit and stored in the storing unit before the first tag data reading unit reads the tag data;
   an extracting unit configured to extract from the storing unit the transmit data in association with the identification data when the first determination unit determines that the tag data read by the first tag data reading unit corresponds to the identification data;
   a display unit configured to display contents of the transmit data that is extracted by the extracting unit when the first determination unit determines that the tag data corresponds to the identification data stored in the storing unit before the first tag data reading unit reads the tag data;
   a second determination unit configured to determine whether a transmission instruction is input for the transmit data that is extracted by the extracting unit when the first determination unit determines that the tag data corresponds to the identification data stored in the storing unit before the first tag data reading unit reads the tag data and is displayed on the display unit; and
   a second transmitting unit configured to transmit to the destination device the transmit data that is extracted by the extracting unit when the first determination unit determines that the tag data corresponds to the identification data stored in the storing unit before the first tag data reading unit reads the tag data and is displayed on the display unit when the second determination unit determines that the transmission instruction is input.

14. The communication system according to claim 13,
wherein the information terminal further comprises a second tag data reading unit configured to read the tag data from the wireless tag, and
wherein the identification data is comprised in the tag data and is transmitted from the information terminal to the communication device.

15. A communication device configured to be communicable with an information terminal, the communication device comprising:
   a communication section configured to connect to a communication network;
   a receiving unit configured to receive transmit data and identification data from the information terminal through the communication network, the transmit data comprising document data and destination specifying data that specifies a destination device;
   a storing unit configured to store the transmit data and the identification data in association with each other;
   a tag data reading unit configured to read tag data from a wireless tag, the tag data being written therein;
   an extracting unit configured to extract from the storing unit the transmit data in association with the identification data stored in the storing unit before the tag data reading unit reads the tag data when the tag data corresponds to the identification data stored in the storing unit before the tag data reading unit reads the tag data;
   a display unit configured to display contents of the transmit data that is extracted by the extracting unit when the tag data corresponds to the identification data stored in the storing unit before the tag data reading unit reads the tag data;
   a modification operating unit;
   a modification unit configured to modify the contents of the transmit data that is extracted by the extracting unit when the tag data corresponds to the identification data stored in the storing unit before the tag data reading unit reads the tag data and is displayed on the display unit based on a modification operation at the modification operating unit; and
   a transmitting unit configured to transmit to the destination device specified by the destination specifying data comprised in the transmit data that is extracted by the extracting unit when the tag data corresponds to the identification data stored in the storing unit before the tag data reading unit reads the tag data and is displayed on the display unit, through the communication section, the document data comprised in the transmit data that is extracted by the extracting unit when the tag data corresponds to the identification data stored in the storing unit before the tag data reading unit reads the tag data and is displayed on the display unit.

* * * * *